United States Patent
Johnson et al.

(10) Patent No.: US 6,664,508 B1
(45) Date of Patent: Dec. 16, 2003

(54) PENETRATION FLUX

(75) Inventors: Matthew Q. Johnson, Powell, OH (US); Christopher M. Fountain, Upper Arlington, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 0 days.

(21) Appl. No.: 09/787,800

(22) PCT Filed: Sep. 23, 1999

(86) PCT No.: PCT/US99/22066

§ 371 (c)(1),
(2), (4) Date: Jul. 24, 2001

(87) PCT Pub. No.: WO00/16940

PCT Pub. Date: Mar. 30, 2000

(Under 37 CFR 1.47)

Related U.S. Application Data

(60) Provisional application No. 60/101,621, filed on Sep. 24, 1998.

(51) Int. Cl.$^7$ .................................................. B23K 9/00
(52) U.S. Cl. .............................. 219/137 WM; 219/136
(58) Field of Search ................................. 219/137 WM, 219/136, 145.1, 146.1; 148/22, 23

(56) References Cited

U.S. PATENT DOCUMENTS

| | | | |
|---|---|---|---|
| 1,814,878 A | * | 7/1931 | Weed |
| 2,043,960 A | | 6/1936 | Jones et al. |
| 2,200,737 A | | 5/1940 | Clapp |
| 2,415,149 A | | 2/1947 | Sjoman |
| 2,636,103 A | | 4/1953 | Vazquez-Arias |
| 2,892,746 A | * | 6/1959 | Brennan ........................ 148/26 |
| 2,994,762 A | * | 8/1961 | Todd ............................ 219/76 |
| 3,001,898 A | | 9/1961 | Johnson |
| 3,551,218 A | | 12/1970 | Gurevich |
| 3,554,792 A | * | 1/1971 | Johnson ...................... 117/205 |
| 3,584,187 A | | 6/1971 | Majetich et al. ............. 219/137 |
| 3,627,574 A | | 12/1971 | Delong et al. ............... 117/205 |
| 3,731,868 A | | 5/1973 | Arikawa et al. |
| 3,849,211 A | | 11/1974 | Gurevich |
| 4,071,732 A | | 1/1978 | Tanaka et al. |
| 4,072,845 A | * | 2/1978 | Buckingham et al. ... 219/146.3 |
| 4,131,493 A | | 12/1978 | Gurevich et al. |
| 4,363,676 A | | 12/1982 | Crockett et al. |
| 4,439,498 A | | 3/1984 | Sadowski .................... 428/558 |
| 4,683,011 A | | 7/1987 | Weaver et al. |
| 4,800,131 A | * | 1/1989 | Marshall et al. ............. 428/558 |
| 5,525,163 A | | 6/1996 | Conaway et al. ............. 148/23 |
| 5,804,792 A | * | 9/1998 | Paskell ............... 219/137 WM |

OTHER PUBLICATIONS

Eroshenko, L.E. et al., An Examination of the Glow of Anode Vapours for the Evaluation of the Technological Characteristics of the Arc Running in Argon, Avt. Svarka, 1979, No. 9, pp. 33–35.

Raimond, E.D. et al., Welding of High–Strength Steel Using Activating Fluxes in Powder Form, Svar. Proiz., 1973, No. 6, pp. 18–19 (also Weld. Prod., Jun. 1973, vol. 20(6) pp. 29–30).

Takeuchi, Y. et al., Effect of Bismuth on Weld Joint Penetrtion in Austenitic Stainless Steel, Welding Journal, 1986, 274s–280s.

Heiple, C.R. et al., Effects of SO2 Shielding Gas Additions on GTA Weld Shape, Welding Research Supplement, Jun. 1985, 159–s–162–s.

Simonik, A.G., Influence of Halides on the Penetration Effect in Argon–Arc Welding of Titanium Alloys, Svar. Proiz., 1974, No. 3. pp. 52–53.

Wen, J. et al., Technical Note: Surface Tension of 304 Stainless Steel under Welding Conditions, Welding Journal, May, 1986, 138s.

Lucas, W. et al., Effect of Cast to Cast Material Variations in TIG Welding–Literature Review, 1981, pp.1–9.

Prilutskii, V.P. et al., The Endurance of Tungsten Elecctrodes Used for the Argon TIG Welding of Titanium with a Flux, Avt. Svarka, 1979, No. 10, pp. 41–43.

Eroshenko et al., Research into the Spectrum of the Arc Plasma During the Argon TIG Welding, with Flux, of Titanium, Avt. Svarka, 1980, No. 9, pp.23–25.

* cited by examiner

Primary Examiner—M. Alexandra Elve
(74) Attorney, Agent, or Firm—Gallagher & Dawsey LPA; David J. Dawsey; Michael J. Gallagher

(57) ABSTRACT

Deep penetration gas tungsten arc welds are achieved using titanates such as $Na_2Ti_3O_7$ or $K_2TiO_3$. A small amount of the titanate is applied to the weld zone in a carrier fluid paste or as part of a wire filler to afford deep penetration welds in carbon, chrome-molybdenum, and stainless steels as well as nickel-based alloys. To control arc wander, bead consistency, and slag and surface appearance of the weldments, various additional components may be optionally added to the titanate flux including transition metal oxides such as $TiO$, $TiO_2$, $Cr_2O_3$, and $Fe_2O_3$, silicon dioxide, manganese silicides, fluorides and chlorides. However, the toxicity of the plumes from halide additives and the necessity of post-weld removal to prevent corrosion may preclude their use. In addition, it was found that a flux of titanium oxides, $Fe_2O_3$ and $Cr_2O_3$ affords deep weld penetration in carbon steels and nickel-based alloys but with some heat-to-heat variation.

3 Claims, No Drawings

PENETRATION FLUX

CROSS REFERENCE TO RELATED APPLICATION

This application claims the benefit of U.S. Provisional application No. 60/101,621 filed on Sep. 24, 1998 all of which is incorporated by reference as if completely written herein.

The U.S. Government has a paid-up license in this invention and the right in limited circumstances to require the patent owner to license others on reasonable terms as provided for by the terms of contract No. N00140-96-C-0188 awarded by the Department of the Navy.

BACKGROUND OF THE INVENTION

1. Field

This application related to gas tungsten arc welding and more particularly to a titanate flux that substantially increases weld penetration.

2. Background

The gas tungsten arc welding (GTAW) process is an arc welding process that uses an arc between a non-consumable tungsten electrode and the work piece to cause localized coalescence of the base material. The GTAW process is used to produce high quality welds in a variety of materials. Applications include welding of sheet, plate, tube, and castings for use in aerospace, power generation, shipbuilding, and other industries. GTAW can be used with filler metals or consumable inserts to produce welds in thick sections. Autogenous welds (welds without filler metals) can be made in thin sections or for root passes in thick sections.

The primary limitation of the process is low productivity due to low deposition rates and shallow penetration. The inability of GTAW to produce welds with deep penetration limits the thickness of material that can be reliably joined to less than approximately 0.10 in (2.5 mm) thick. Materials greater than 0.1 in (2.5 mm) thick typically require weld joint preparation and multiple passes to fill the weld joint. GTAW welds are also affected by heat-to-heat compositional variations in the material being welded. While variable penetration is most often encountered in stainless steel and nickel-based alloys, this phenomenon occurs in other materials as well.

A method of increasing both the amount and consistency of penetration in gas tungsten arc (GTA) weldments is to apply a thin layer of flux to the surface of the part or joint to be welded prior to welding. The use of traditional fluxes for the GTAW process is not required since shielding and arc stabilization are provided by the use of an external shielding gas. Fluxes used for GTAW to improve penetration are inherently different than those used for soldering, brazing, or other arc welding processes since they neither clean the surface of the part nor protect the weld pool from oxidation.

The use of flux for increasing penetration in mild steel materials has been described by several authors in the former Soviet Union. An article by E. D. Raimond et al. titled "Welding of High Strength Steel Using Activating Fluxes in Powder Form" *Svar. Proiz*, No. 6, pp. 18–19, suggests that the use of Soviet Flux FS-71 increased GTAW penetration in steel by 50–100 percent. No compositional details were given for the flux. A later article by O.E. Ostroviski entitled "The Effect of Activating Fluxes on the Penetration Capability of the Welding Arc and the Energy Concentration in the Anode Spot" *Svar. Proiz*, No. 3, pp. 3–4, 1977, reveals that the composition of flux FS-71 is 57.3 percent $SiO_2$, 6.4 NaF, 13.6 $TiO_2$, 13.6 Ti, and 9.1 $Cr_2O_3$. Another paper by L. E. Eroshenko et al, titled "An Examiantion of the Glow of Anode Vapors for the Evaluation of the Technological Characteristics of the Arc Running in Argon, *Avt. Svarka*, 1979, No. 9, pp. 33–35, evaluated the enhanced penetration caused by fluorides of several alkali and alkaline-earth elements. The effects of individual fluorides were studied and the fluorides evaluated in the study were used as a basis for selecting components for titanium and steel GTAW fluxes. A similar approach to the Soviet flux design is described in U.S. Pat. No. 5,525,163 by H. R. Conaway et. al. They claim that the use of 7 to 59 percent LIF promotes penetration in 321 austenitic stainless steel. They infer that this ingredient will promote enhanced penetration in other materials such as carbon steel as well. Paskell describes a flux composed of TiO or $TiO_2$ (50%), $Cr_2O_3$ (40%) and $SiO_2$ (10%) in U.S. Pat. No. 5,804,792 that is used to increase the penetration in stainless steel.

The flux reported by Ostrovski (FS-71) and flux no. 69 reported by Conaway (23.6 $Al_2C_3$, 39.4 LiF, 15.7 MgO, 5 $B_2O_3$, and 15.7 $Fe_2O_3$) were evaluated the instant effort on SA178 Gr. C mild steel pipe. Neither flux spread well or produced consistently improved penetration above what was measured without flux. Additionally, these fluxes both contain fluorides which can increase the risk of corrosion in some environments and which generated a considerable amount of fluoride based fume which is can be hazardous as well.

It is an object of the present invention to provide a flux composition for use with the GTA process that improves weld penetration in a variety of steels including stainless steel and also in nickel-based alloys.

It is an object of the present invention to reduce the cost of the GTA process by reducing the time and effort in joint preparation.

It is an object of the present invention to reduce the number of passes in a multi-pass gas tungsten arc weld.

It is an object of the present invention to reduce the distortion in a gas tungsten arc weld.

It is an object of the present invention to produce welds with mechanical properties that are not degraded through the use of the flux composition.

It is an object of the present invention to produce welds with a weld quality that is not degraded through the use of the flux composition.

The foregoing and other objects, features and advantages of the invention will become apparent from the following disclosure in which one or more preferred embodiments of the invention are described in detail. It is contemplated that variations in procedures may appear to a person skilled in the art without departing from the scope of or sacrificing any of the advantages of the invention.

SUMMARY

The above objects are met in the present invention by using a "titanate" penetration flux to achieve deep penetration welds in gas tungsten arc welding (GTAW). As used here, a "titanate" is a salt and/or complex oxide of titanium such as $TiO_3^{-2}$, $TiO_4^{-4}$, $Ti_2O_5^{-2}$, $Ti_2O_7^{-4}$, and $Ti_3O_7^{-2}$. The titantate is selected from alkaline-earth titanates, transition metal titanates, and alkali metal titanates such as $Na_2Ti_3O_7$ or $K_2TiO_3$. Only a small amount of the titanate alone applied to the weld zone as a thin paste by mixing with a carrier fluid such as an alcohol or ketone or as part of a wire filler is sufficient to promote deep penetration GTAW of a wide variety of metals including carbon, chrome-molybdenum, and stainless steels as well as nickel-based alloys.

To control arc wander, bead consistency, and slag and surface appearance of the gas tungsten arc weldments, a wide variety of additional components may be optionally added to the titanate flux including transition metal oxides such as TiO, $TiO_2$, $Cr_2O_3$, and $Fe_2O_3$, alkali oxides, alkaline-earth oxides, silicon dioxide, manganese silicides, alkali fluorides, alkaline-earth fluorides, alkali chlorides, and alkaline-earth chlorides. However, the toxicity of the plumes from halides and resulting weld corrosion may preclude halide use.

During the development of the titanate flux, it was found that a composition of TiO and/or $TiO_2$, $Cr_2O_3$, and $Fe_2O_3$ gave good weld penetation in GTAW but with heat-to-heat variation in carbon steel and nickel-based alloys. Such a flux has about 5–40 wt % $Fe_2O_3$, 20–70 wt % $Cr_2O_3$, and 15–70 wt % of TiO or $TiO_2$ or both with a more preferred composition having about 6 wt % $Fe_2O_3$, 60 wt % $Cr_2O_3$, 22 wt % $TiO_2$ and 12 wt % TiO.

The method of using the titanate flux is quite simple. The flux is applied to the weld zone of the metal components to be joined as a thin paste, as part of a filler wire or even as part of the shielding gas. The metal components are welded together using a gas tungsten arc welding torch.

The foregoing and other objects, features and advantages of the invention will become apparent from the following disclosure in which one or more preferred embodiments of the invention are described in detail and illustrated in the accompanying examples. It is contemplated that variations in compositions and their use in the welding process may appear to a person skilled in the art without departing from the scope of or sacrificing any of the advantages of the invention.

DETAILED DESCRIPTION OF THE INVENTION AND BEST MODE FOR CARRYING OUT THE PREFERRED EMBODIMENT

In its basic form the present invention features the use of a "titanate" to enhance weld penetration in the gas tungsten arc welding process. As used here, a "titanate" is a salt and/or complex oxide of titanium such as $TiO_3^{-2}$, $TiO_4^{-4}$, $Ti_2O_5^{-2}$, $Ti_2O_7^{-4}$, and $Ti_3O_7^{-2}$ Illustrative titanate include alkali metal titanates ($M_2TiO_3$, $M_2Ti_2O_5$, $M_2Ti_3O_7$) such as $Na_2Ti_3O_7$, $K_2TiO_3$, $K_2Ti_2O_5$; alkali earth metal titanates ($M_2TiO_4$) such as $MgTiO_3$, $SrTiO_3$, $BaTiO_3$, and $CaTiO_3$, and transition metal titanates ($M_2TiO_4$, $MTiO_3$) such as $FeTiO_3$ and $ZnTiO_4$. In addition to improving weld penetration, that is, weld depth, these compositions are also capable of reducing heat-to-heat penetration variations.

The titanate compounds typically are used in the form of high-purity powders of about −325 mesh or finer. These penetration enhancing titanate compounds can be applied to the weld zone of the metal components to be welded by mixing the powders with a suitable carrier fluid such as methanol, ethanol, methyl ethyl ketone or other suitable carrier fluid to form a paste and applied to the component surface. Alternatively the titanate compound can also be included as part of a filler wire or rod and introduced into the weld pool through wire additions.

The primary purpose of the titanate compound is to improve penetration and reduce heat-to-heat variations in penetration. When compared to autogenous welds produced without flux, the penetration enhancing titanate compounds produce welds of superior penetration and at least comparable weld quality. Further these titanate compounds reduce the cost of welding through simplification of joint preparation, reduced consumption of filler wire, and reduced weld distortion. Titanate salts, by themselves, have been shown to enhance weld penetration with a wide variety of metals and alloy compositions including carbon steel, chrome-molybdenum steels, low alloy steel, austenitic stainless steel, and nickel-based alloys. Over 320 flux compositions were evaluated with some of the better compositions shown in Table 1.

These fluxes consist of at least one titanate compound such as $Na_2Ti_3O_7$ or $K_2TiO_3$ Optionally these titanate penetrations fluxes may further comprise oxides of transition metals, oxides of alkali and alkaline-earth elements, silicon dioxide, and manganese silicide to control arc wander and improve bead consistency, slag appearance, and flux spreading. Typically transition metal oxides such as $Cr_2O_3$, TiO, $TiO_2$, and $Fe_2O_3$ can be added to the titanate in amounts up to about 75 wt %. $Cr_2O_3$ is preferably used in the range of about 20–60 wt % with about 35–45 wt % giving consistent results when used with a variety of steels and nickel-based alloys. $Fe_2O_3$ is used in a range of about 5–40 wt % with about 10–25 wt % preferred and $_{15}$-20 wt% giving consistent results over the range of metals used. TiO or $TiO_2$ or both are used with the titanate in amounts of about 15–70 wt % with 20–60 wt % preferred and 45–55 wt % giving consistent results for the various metals used. Silicon dioxide is used in amounts of about 3–30 wt % with 5–25 wt % preferred and about 6–15% giving good results for all metals tested. Manganese silicides are used in amounts of about 3–15 wt % with 5–10 wt % being preferred. The addition of halides to these titanate compositions does not degrade weld performance. Fluorides and chlorides are used in amounts of about 5–60 wt % with 20–45 wt % preferred and 35–40 wt % give goods results for most materials. Depending on alloy type, the titanate composition of these compounds can be adjusted to optimize weld characteristics for a given alloy system.

It is to be realized that the titanate compound is the controlling compound in these formulations which gives rise to deep penetration welds. Only a small amount of titanate need be applied to the weld pool to achieve deep penetrations welds. The weld penetration achieved with a titanate does not appear to depend in an interactive way on the amounts of other materials added to the flux. That is, the depth of weld penetration depends on the presence of titanate alone rather than on other materials and the interaction between these materials and the titanate. The wt % of titanate in a composition with other components can be minimal with regard to the other components of the flux, the filler material, inert materials, and/or the fluid carrier and yet still preserve its ability to afford good weld penetration. Generally the requisite amount of titanate in a particular composition should be sufficient to afford a thin open or closed coating of a −325 mesh titanate when all other components are removed.

TABLE 1

Chemical compositions (wt %) of GTAW fluxes used to improve penetration in carbon steel, stainless steel, and nickel-based alloys

|  | CC36 | CS197 | CS207 | CS222 | CS223 | CS290 | CS282 | CS286 |
|---|---|---|---|---|---|---|---|---|
| $Fe_2O_3$ | 27 | 15 | 6 |  |  | 1 |  |  |
| $Cr_2O_3$ | 41 | 35 | 60 |  |  | 1 |  |  |
| $TiO_2$ | 32 | 30 | 22 |  |  | 1 |  | 6 |
| TiO |  | 20 | 12 |  |  | 1 |  |  |
| $Na_2Ti_3O_7$ |  |  |  |  | 100 | 88 | 94 | 88 |
| $K_2TiO_3$ |  |  |  | 100 |  |  |  |  |
| $SiO_2$ |  |  |  |  |  | 7 | 6 | 6 |

EXAMPLE 1

All of the fluxes shown in Table 1 were found to give complete penetration in ASTM SA178-C and SA210-A1 pipe with wall thickness of 0.180 in (0.457 mm) and nominal outside diameter (O.D.) of 2.5 in (0.46 cm). Bead-on-plate welds were produced on the pipe using the GTAW process with and without the fluxes listed in Table 1. Complete penetration was achieved with the welding parameters given in Table 2. While adequate penetration was obtained in the majority of the SA178-C welds when fluxes CC-36, CS-197, and CS-207 were used, heat-to-heat variability was observed. This heat-to-heat variability was attributed to the poor cleanliness of the steel. These heat-to-heat variations were eliminated using fluxes containing $Na_2Ti_3O_7$ or $K_2TiO_3$ alone or with other components.

TABLE 2

Welding parameters used on 2 in. (5 cm) diameter 0.165 in (0.419 mm) wall SA178-C and SA210-A1 pipe.

| Variable | Value |
|---|---|
| Torch position | Fixed Top Dead Center (TDC) |
| Current | 140–145 A Direct Current Straight Polarity (DCSP) |
| Voltage | Adjust to give ~1/16" (0.0025 mm) arc length |
| Travel speed | 3 ipm (7.6 cm/min) |
| Shielding gas/flow rate | Argon/30 cfh (0.850 m³/hr) |
| Backing gas/flow rate | Argon/15 cfh (0.425 m³/hr) |
| Electrode | 3/32" (0.0037 mm) 2% thoriated |
| Electrode preparation | 45° included angle, 0.02 in (0.51 mm) blunt |

EXAMPLE 2

Bead-on-plate welds were produced on 0.25 in (6.4 mm) thick A36 steel using (a) no flux, (b) carbon steel flux CS286, and (c) carbon steel flux CS290. All welds were produced using a welding current of 150 A, travel speed of 3 ipm (7.62 cm/min), and arc voltage of 9.5–9.8 V (to produce 1/16 in (0.0025 mm) arc length). These compositions more than double penetration when used on mild steel (A36 plate). Full and consistent penetration of this plate was achieved without flux at a welding current of 250 A, travel speed of 3 ipm (7.62cm/min), and a voltage of 9.5 V. When using CS286, full penetration and consistent penetration was achieved using a welding current of 180 A, 3 ipm (7.62 cm/min), and 9.8 V. The surface appearance of the welds can be improved without compromising the penetration enhancement of the flux by adding small quantities of halides such as alkali and alkaline-earth fluorides and/or chlorides. However, it is to be realized that the addition of halides does produce undesirable toxic fumes during the welding process and can cause corrosion problems if not removed from the weld following welding.

TABLE 3

Welding parameters used to produce bead-on-plate welds.

| Variable | Value |
|---|---|
| Torch position | 1G (Flat Position Welding) |
| Current | 150 A (DCSP) |
| Voltage | 9–9.5 V to give 1/16" (0.0025 mm) arc length |
| Travel speed | 3 ipm (7.6 cm/min) |
| Shielding gas/flow rate | Argon/30 cfh (0.850 m³/hr) |
| Backing gas/flow rate | Argon/15 cfh (0.425 m²hr) |
| Electrode | 3/32" (0.0037 mm) 2% thoriated |
| Electrode preparation | 45° included angle, 0.02 in (0.51 mm) blunt |

EXAMPLE 3

In addition to improving penetration in steel, some flux compositions developed for carbon steel have been shown to work well in nickel-based alloys. An example of this is flux CS207. Welds were produced in Alloy 718 without flux and using CS207 flux. The Alloy 718 test plate that was used was 0.400 in (1.02 cm) thick. The welding parameters used to produce the welds are listed in Table 4. When welding with identical parameters, the use of CS207 improved weld penetration more than 300 percent. Flux compositions can be used with nickel-based alloys as well as carbon steel alloys.

TABLE 4

Welding parameters used to produce welds in Alloy 718

| Variable | Value |
|---|---|
| Torch position | 1G |
| Current | 245 A (DCSP) |
| Voltage | 9.7–10 V to give 1/16" (0.0025 mm) arc length |
| Travel speed | 3 ipm (7.6 cm/min) |
| Shielding gas/flow rate | Argon/30 cfh (0.850 m³/hr) |
| Backing gas/flow rate | Argon/15 cfh (0.425 m³/hr) |
| Electrode | 3/32" (0.0037 mm) 2% thoriated |
| Electrode preparation | 45° included angle, 0.02 in (0.51 mm) blunt |

EXAMPLE 4

In addition to improving penetration in steel, some flux compositions developed for carbon steel have been shown to work well in austenitic stainless steel alloys. As with the carbon steel welds, the active ingredient responsible for improving penetration in stainless steel welds was found to be the $Na_2Ti_3O_7$ or $K_2TiO_3$ titanate by iself. Similar penetration enhancement was measured when using fluxes CS282, CS286, and CS290 as well. These fluxes are useful in applications involving stainless steel in addition to carbon steel.

It is possible that changes in configurations to other than those shown could be used but that which is shown if preferred and typical. The present invention may suitably comprise, consist of, or consist essentially of a titanate as herein defined. The invention illustratively disclosed herein suitably may be practiced in the absence of any element which is not specifically disclosed herein.

It is therefore understood that although the present invention has been specifically disclosed with the preferred embodiment and examples, modifications to the design concerning application methods and additional additives and amounts of components will be apparent to those skilled in the art and such modifications and variations are considered to be equivalent to and within the scope of the disclosed invention and the appended claims.

We claim:

1. A composition for use as a welding penetration flux comprising a titanate that gives rise to a deep penetration weld, comprising:
   at least one compound selected from the group of compounds consisting of at least one transition metal oxide selected from the group of transition metal oxides consisting of TiO, $TiO_2$, $Cr_2O_3$; and $Fe_2O_3$.

2. The composition of claim 1, wherein the at least one transition metal oxide is a titanium oxide.

3. The composition of claim 1, wherein the at least one transition metal oxides are TiO, $TiO_2$ and $Cr_2O_3$.

* * * * *